(12) United States Patent
Obitsu

(10) Patent No.: US 6,380,982 B1
(45) Date of Patent: Apr. 30, 2002

(54) VIDEO SIGNAL PROCESSING CIRCUIT AND COMPUTER SYSTEM

(75) Inventor: Toshiro Obitsu, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/040,424

(22) Filed: Mar. 18, 1998

(30) Foreign Application Priority Data

Oct. 16, 1997 (JP) .............................................. 9-284041

(51) Int. Cl.[7] .......................... H04N 7/00; H04N 11/00; H04N 5/63
(52) U.S. Cl. ........................ 348/552; 348/730; 348/604; 345/211
(58) Field of Search ................................ 348/730, 552, 348/572, 604, 419, 573; 725/85, 100, 131, 139, 151, 153; 345/211; H04N 7/00, 11/00, 5/63

(56) References Cited

U.S. PATENT DOCUMENTS

| | | | |
|---|---|---|---|
| 4,736,240 A | * 4/1988 | Samuels ...................... 348/708 |
| 4,788,591 A | * 11/1988 | Decraemer .................. 348/730 |
| 5,161,022 A | * 11/1992 | Ichimura et al. ............ 348/730 |
| 5,389,952 A | * 2/1995 | Kikinis ........................ 345/212 |
| 5,543,819 A | * 8/1996 | Farwell et al. ............... 345/150 |
| 5,552,836 A | * 9/1996 | Nobuoka ..................... 348/730 |
| 5,671,017 A | * 9/1997 | Chujo ......................... 348/378 |
| 5,736,873 A | * 4/1998 | Hwang ........................ 348/444 |
| 5,808,693 A | * 9/1998 | Yamashita et al. .......... 348/554 |
| 5,896,177 A | * 4/1999 | Hwang et al. ............... 348/445 |
| 6,097,437 A | * 8/2000 | Hwang ........................ 348/730 |

FOREIGN PATENT DOCUMENTS

| JP | 60010983 A | * | 1/1985 |
| JP | 63203070 A | * | 8/1988 |
| JP | 5-176333 | | 7/1993 |
| JP | 6-292062 | | 10/1994 |
| JP | 11122515 A | * | 4/1999 |

* cited by examiner

Primary Examiner—Michael Lee
Assistant Examiner—Linus H. Lo
(74) Attorney, Agent, or Firm—Staas & Halsey LLP

(57) ABSTRACT

A video signal processing circuit, in which a horizontal synchronizing signal is separated from an input analog video signal by a synchronism separating circuit, whether a "H" period of the horizontal synchronizing signal continues for more than a prespecified period of time or not is checked by a synchronizing signal monitoring counter, and power supply to an A/D converter is controlled thereby according to a result the confirmation.

6 Claims, 4 Drawing Sheets

VIDEO SIGNAL PROCESSING CIRCUIT AND COMPUTER SYSTEM

FIELD OF THE INVENTION

The present invention relates to a video signal processing circuit for controlling power supply required for A/D conversion of an analog video signal as well as to a computer system with the video single processing circuit applied therein.

BACKGROUND OF THE INVENTION

In recent years, a battery-driven system has generally been employed in a computer system such as a notebook personal computer. In this battery-driven system, a driving time is limited because of correlation between a battery life and a driving time. For this reason, in the case of the computer system, a technology of extending a continuous driving time for a system by reducing power consumption for the system as a whole has been demanded.

With the current state of the technology, however, as power is always supplied to a sampling circuit for an A/D converter, the circuit is driven, even when an irregular signal is received or a period with no signal received continues, for sampling to subject the signal to A/D conversion. For this reason, even when it is conceivable from the view point of an A/D converter and a video signal processing circuit as a peripheral unit thereof or of the system as a whole that, even when the sampling driving is not needed, power is supplied to an A/D converter and the power is wastefully consumed, which makes an operating time of the whole system shorter.

There are some analogous technologies to solve the problem concerning the power consumption disclosed, for example, in Japanese Patent Laid-Open Publication No. HEI 5-176333 and Japanese Patent Laid-Open Publication No. HEI 6-292062. Disclosed in Japanese Patent Laid-Open Publication No. HEI 5-176333 is a technology that a video signal processing circuit detects a vertical blanking period from a received complex synchronizing signal and turns OFF an A/D converter for the period of time. Also disclosed in Japanese Patent Laid-Open Publication No. HEI 6-292062 is a technology as a method of saving power for a video camera that power to a camera block including an A/D converter is cut off during a standby state for recording.

In the conventional type of computer system like those in Japanese Patent Laid-Open Publication No. HEI 5-176333 and Japanese Patent Laid-Open Publication No. HEI 6-292062, only a prespecified period of time required for video signal processing like the vertical blanking period is devoted to reduction of power consumption, or reduction of power consumption is effected by certain operational situations in the system like the standby state for recording.

However, an approach of controlling power consumption by directly determining a received video signal itself is required for actually dealing with video signal processing in real time.

SUMMARY OF THE INVENTION

It is a first object of the present invention, putting attention to a received video signal itself, to provide a video signal processing circuit which can prevent wasteful power consumption in the circuit as a whole by eliminating unnecessary A/D conversion according to a video signal.

It is a second object of the present invention to provide a computer system which can prevent wasteful power consumption in the system as a whole by applying therein the video signal processing circuit which achieves the first object.

With the present invention, power supply for A/D conversion is controlled according to a synchronizing signal to an input analog video signal, so that unnecessary A/D conversion is eliminated according to a video signal, and with this feature, it is possible to prevent wasteful power consumption in a circuit as a whole.

With the present invention, power supply for A/D conversion is executed only when a synchronizing signal separated from an input analog video signal satisfies prespecified conditions, so that unnecessary A/D conversion for any video signal not satisfying the prespecified conditions is eliminated, and with this feature, it is possible to prevent wasteful power consumption in a circuit as a whole.

With the present invention, power supply for A/D conversion is executed only when a "H" (high) period of a horizontal synchronizing signal separated from an input analog video signal continues for more than a prespecified period of time, so that unnecessary A/D conversion for any video signal in which the "H" (high) period of a horizontal synchronizing signal does not reach the prespecified period of time is eliminated, and with this feature, it is possible to prevent wasteful power consumption in a circuit as a whole.

With the present invention, power supply is stopped when disturbance is confirmed in a horizontal synchronizing signal separated from an input analog video signal, so that power supply can be controlled in real time according to change in a horizontal synchronizing signal after normal power supply is started, and with this feature, it is possible to realize reduction of power consumption in real time in a circuit as a whole.

With the present invention, in a video signal processing circuit, power supply from a power supply unit for A/D conversion is controlled according to a synchronizing signal to an input analog video signal, so that unnecessary A/D conversion is eliminated according to a video signal, and with this feature, it is possible to prevent wasteful power consumption in a system as a whole.

With the present invention, in a video signal processing circuit, power supply from a power supply unit for A/D conversion is executed only when a synchronizing signal separated from an input analog video signal satisfies prespecified conditions, so that unnecessary A/D conversion is eliminated to any video signal which does not satisfy the prespecified conditions, and with this feature, it is possible to prevent wasteful power consumption in a system as a whole.

With the present invention, in a video signal processing circuit, power supply from a power supply unit for A/D conversion is executed only when a "H" (high) period of a horizontal synchronizing signal separated from an input analog video signal continues for more than a prespecified period of time, so that unnecessary A/D conversion is eliminated to any video signal in which the "H" (high) period of a horizontal synchronizing signal does not reach the prespecified period of time, and with this feature, it is possible to prevent wasteful power consumption in a system as a whole.

With the present invention, in a video signal processing circuit, power supply is stopped when disturbance is confirmed in a horizontal synchronizing signal separated from an input analog video signal, so that power supply from a power supply unit can be controlled in real time according to change in a horizontal synchronizing signal after normal power supply is started, and with this feature, it is possible to realize reduction of power consumption in real time in a system as a whole.

Other objects and features of this invention will become understood from the following description with reference to the accompanying drawings.

DESCRIPTION OF THE PREFERRED EMBODIMENTS

Detailed description is made hereinafter for a preferred embodiment of a video signal processing circuit and a computer system according to the present invention with reference to the accompanying drawings. It should be noted that description assumes an NTSC system as a television system in the embodiment described below.

Figure 1:
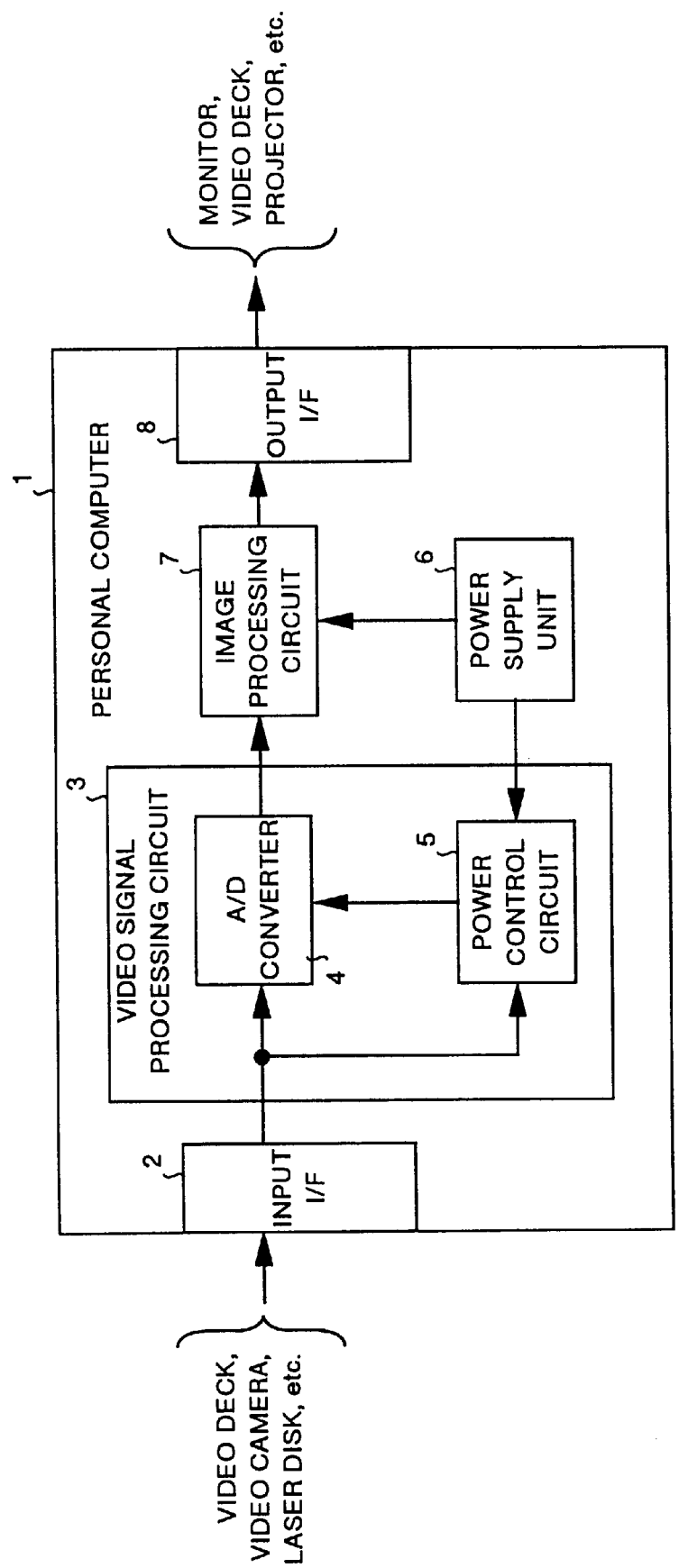
FIG. 1 is a block diagram showing a computer system according to one embodiment of the present invention.

At first, description is made for system configuration. FIG. 1 is a block diagram showing a computer system according to one embodiment of the present invention. FIG. 1 shows a personal computer 1 as one example of a computer system. This computer system 1 comprises an input I/F 2 for interfacing with input units such as a video deck, a video camera and a laser disk drive to receive input of a video signal; a video signal processing circuit 3; a power supply unit 6 comprising a battery for supplying power into the device; an image processing circuit 7; and an output I/F 8 for interfacing with output devices such as a monitor, a video deck, and a projector to output a video signal. It should be noted that a video deck is capable of recording as well as reproducing images by being connected to this personal computer 1, and for this reason, the vide deck is connected to both the input I/F 2 and output I/F 8 for the computer.

The video signal processing circuit 3 comprises an A/D converter 4 for converting an analog video signal received via the input I/F 2 to a digital signal, and a power control circuit 5 connected to a power supply unit 6 for controlling power supply to the A/D converter 4 according to a horizontal synchronizing signal separated from the input analog video signal.

The image processing circuit 7 subjects the digital video signal A/D-converted by the video signal processing circuit 3 to graphic processing to form output data (display data), and outputs the formed output data to a monitor, a video deck, or a projector via the output I/F 8. It should be noted that, if the personal computer 1 provides therein a display monitor, output data is also outputted from the image processing circuit 7 to the display monitor.

Figure 2:
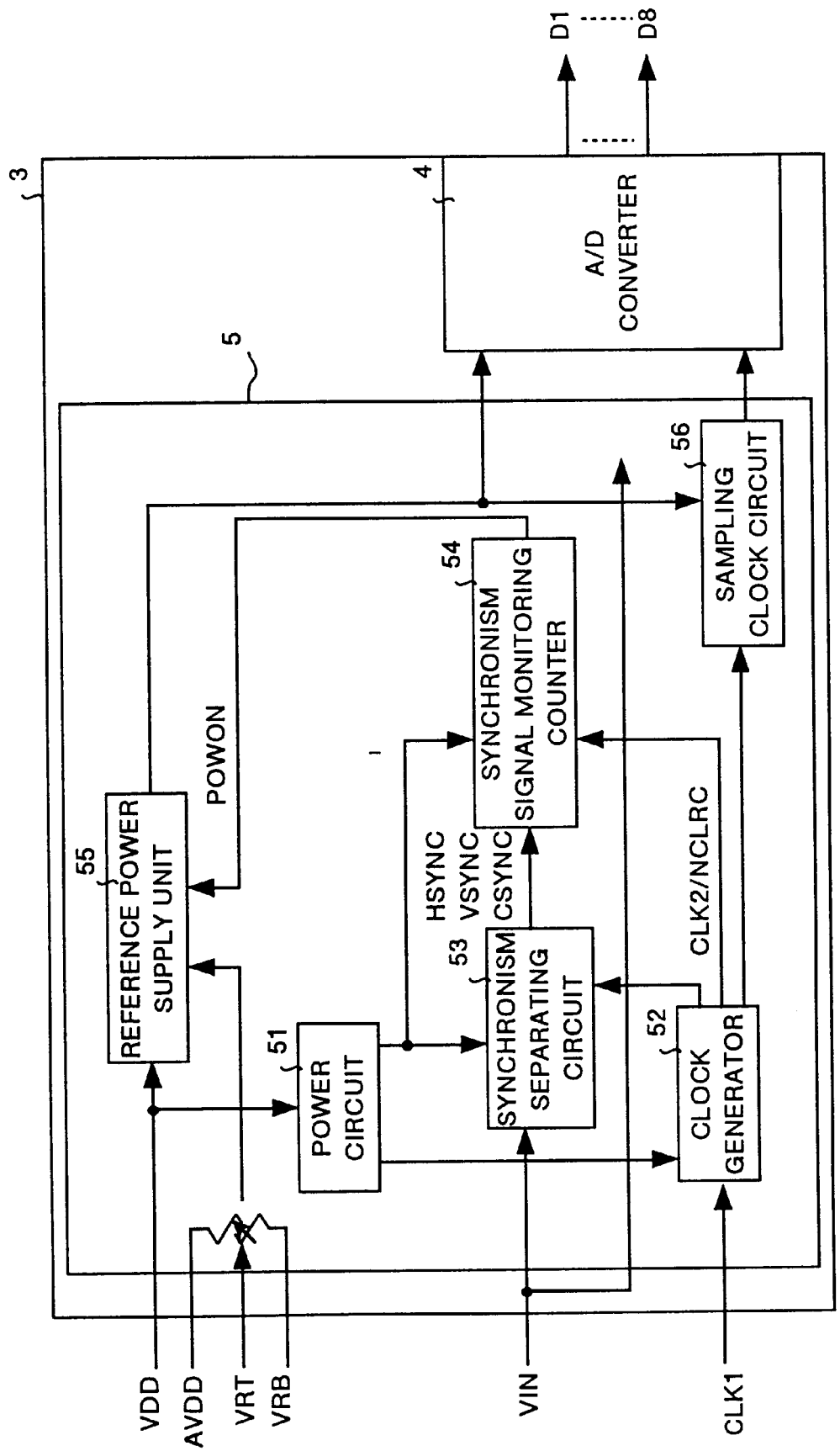
FIG. 2 is a block diagram showing a video signal processing circuit in the computer system shown in FIG. 1.

Next detailed description is made for the video signal processing circuit 3. FIG. 2 is a block diagram showing the video signal processing circuit 3. The video signal processing circuit 3 is divided, as shown in FIG. 1, into the A/D converter 4 and the power control circuit 5.

The power control circuit 5 comprises, as shown in FIG. 2, a power circuit 51, a clock generator 52, a synchronism separating circuit 53, a synchronizing signal monitoring counter 54, a reference power supply unit 55, and a sampling clock circuit 56. The power circuit 51 fetches therein digital power VDD supplied from the power supply unit 6 and supplies the power to the clock generator 52, synchronism separating circuit 53, and the synchronizing signal monitoring counter 54.

The clock generator 52 generates clocks, by dividing a reference clock, according to the synchronizing signal monitoring counter 54 and the sampling clock circuit 56 respectively. This clock generator 52 outputs a clock CLK2 and a noise clear clock NCLRC to the synchronism separating circuit 53. The synchronism separating circuit 53 receives a supply of digital power VDD from the power circuit 51 and executes synchronous reparation according to an inputted NTSC signal VIN. The synchronism separating circuit 53 outputs a horizontal synchronizing signal HSYNC, a vertical synchronizing signal VSYNC, and a complex signal CSYNC each obtained by means of synchronous separation to the synchronizing signal monitoring counter 54.

The synchronizing signal monitoring counter 54 receives a supply of digital power VDD from the power circuit 51 and monitors a period of the synchronizing signal supplied from the synchronism separating circuit 53 according to each timing of the clock CLK2 as well as of the noise clear clock NCLRC from the clock generator 52. This synchronizing signal monitoring counter 54 monitors especially the horizontal synchronizing signal HSYNC, regards a case where the horizontal synchronizing signal HSYNC keeps continuously the "H" state for a prespecified period (e.g. 44.1 $\mu$s) as input of a normal video signal, and sends a power-ON signal POWON to the reference power supply unit 55.

Circuits to which power is always supplied from the power circuit 51 are herein the clock generator 52, synchronism separating circuit 53, and synchronizing signal monitoring counter 54.

The reference power supply unit 55 is supplied with digital power VDD as well as with analog power AVDD variable in a range from the highest reference voltage VRT to the lowest reference voltage VRB, and supplies digital power VDD to the sampling clock circuit 56 as well as to the A/D converter 4 only when the power-ON signal POWON is accepted from the synchronizing signal monitoring counter 54. The sampling clock circuit 56 outputs sampling clocks according to clocks supplied from the clock generator 52 to the A/D converter 4 only when digital power is supplied from the reference power supply unit 55.

The A/D converter 4 can execute a converting operation only when not only power is supplied from the reference power supply unit 55 but also a sampling clock is supplied from the sampling clock circuit 56. The A/D converter supplies power to an internal sampling comparator which is not shown herein, or the like. Also, the A/D converter 4 subjects an NTSC signal VIN received according to a sampling clock from the sampling clock circuit 56 in the sampling comparator to A/D conversion. It is assumed herein that the output video signal consists of 8 bits from D1 to D8.

In the power control circuit 5, when an NTSC signal VIN as a complex signal is received by the synchronism separating circuit 53, a horizontal synchronizing signal HSYNC and a vertical synchronizing signal VSYNC are fetched out. A horizontal synchronizing period is determined from an equalizing pulse period before and after the horizontal synchronizing period according to those horizontal synchronizing signal HSYNC and vertical synchronizing signal VSYNC, and then a horizontal synchronizing pulse is determined.

This horizontal synchronizing pulse is monitored in the synchronizing signal monitoring counter 54. The "H" (high)

period of the horizontal synchronizing signal is sampled (counted) during the monitoring. Although a sampling cycle for a normal video signal is 58.8 µs, sampling is executed at a cycle of around 124 ns in consideration of influence by noises. For this reason, for instance, when the "H" period continues for 44.1 µs in one sampling operation, the synchronizing signal monitoring counter 54 determines that a normal video signal (complex signal) is received.

In the synchronizing signal monitoring counter 54, when it is confirmed that the normal video signal has been received, a power-ON signal POWON to instruct power supply to the A/D converter 4 is outputted to the reference power supply unit 55. The reference power supply unit 55 supplies digital power VDD to the A/D converter 4 only when the power-ON signal POWON is received.

More specifically, power is supplied from the reference power supply unit 55 to the A/D converter 4 as well as to the sampling clock circuit 56. With this operation, an operation of supplying sampling clocks is started in the sampling clock circuit 56 according to clocks sent from the clock generator 52. Supply of the sampling clocks to the A/D converter 4 allows the sampling comparator to be driven in the A/D converter 4. Also, in the A/D converter 4, when a circuit such as the sampling comparator is driven, A/D conversion is executed according to an inputted NTSC signal VIN.

The monitoring operation is always executed in the synchronizing signal monitoring counter 54. Accordingly, output of the power-ON signal POWON to the reference power supply unit 55 is stopped in real time at a point of time when input of the normal video signal (complex signal) can not be confirmed. In other words, when output of the power-ON signal is stopped, not only power supply to the sampling clock circuit 56 but also that to the A/D converter 4 are stopped.

A video signal (complex signal) which is not normal is a signal at a level where neither a video signal nor character information can accurately be reproduced. For example, the signal includes a null signal and noises or the like.

Figure 3:
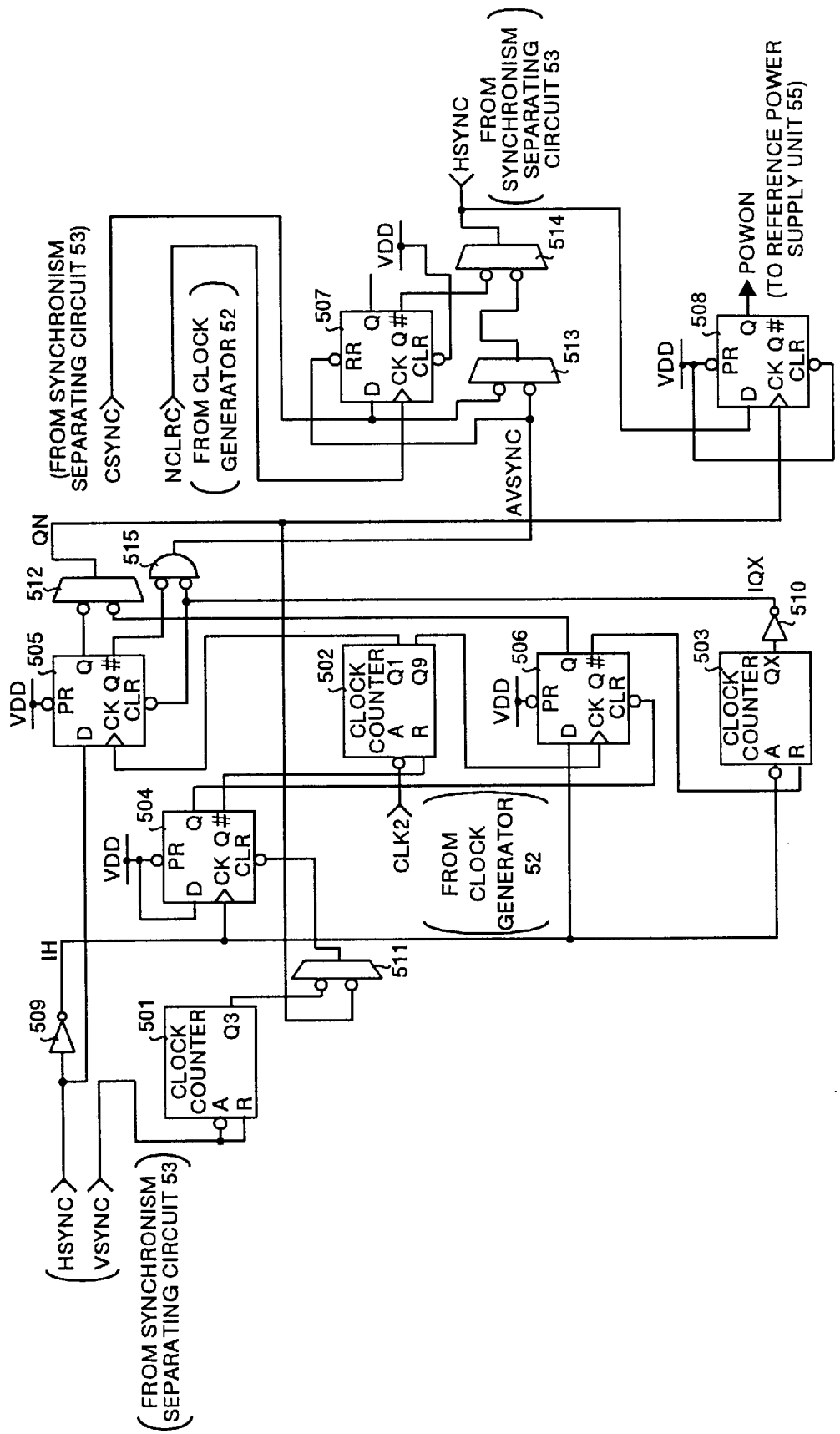
FIG. 3 is a circuit diagram showing a synchronizing signal monitoring counter in the video signal processing circuit shown in FIG. 2.

Further, detailed description is made for an example of operations in one configuration of the synchronizing signal monitoring counter 54. At first, description is made for the configuration. FIG. 3 is a circuit diagram showing the synchronizing signal monitoring counter 54. The synchronizing signal monitoring counter 54 comprises, as shown in FIG. 3, clock counters 501 to 503, flip-flops 504 to 508, inverters 509 and 510, NOR circuits 511 to 514, and a NAND circuit 515.

In FIG. 3, a horizontal synchronizing signal HSYNC is outputted from the synchronism separating circuit 53, and an inverted signal IH is outputted from the inverter 509. A vertical synchronizing signal VSYNC is outputted from the synchronism separating circuit 53, and an output Q3 is a signal outputted from the clock counter 501. An output Q# (inverted signal) is a signal outputted from the flip-flop 504, and an output Q1 is a signal outputted from the clock counter 502.

An output signal QN is outputted from the NOR circuit 512, and an inverted signal IQX is outputted from the inverter 510. Then, a power-ON signal POWON is outputted from the flip-flop 508. A vertical synchronizing signal AVSYNC is a signal outputted from the NAND circuit 515, which does not include any noises.

Figure 4:
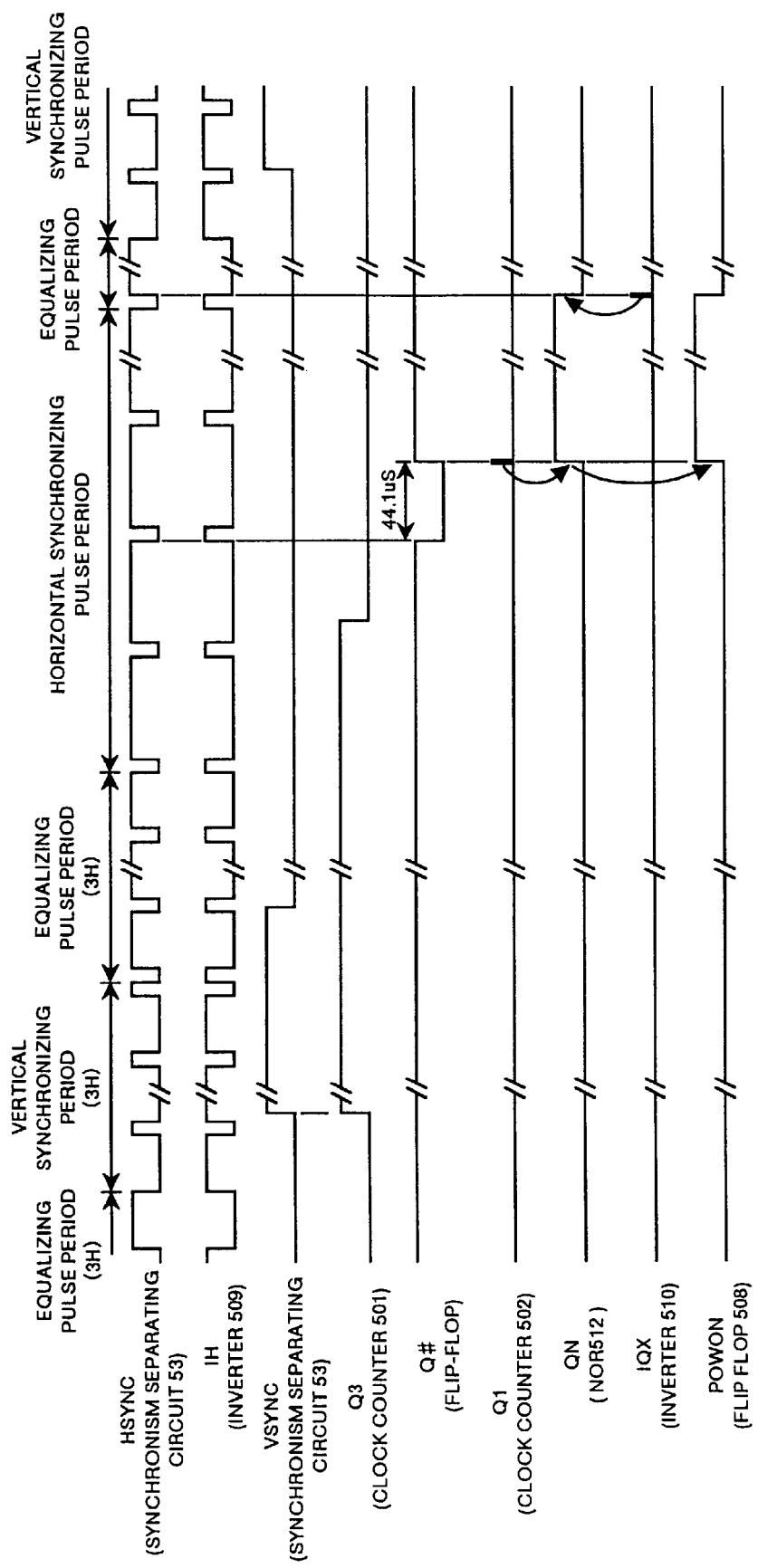
FIG. 4 is a timing chart for explaining operations according to the embodiment.

Next description is made for operations of power control for the A/D converter 4 by the counter 54 shown in FIG. 3 with reference to FIG. 4. FIG. 4 is a timing chart for explaining operations of power control according to the embodiment.

The horizontal synchronizing signal HSYNC has, as shown in FIG. 4, waveforms corresponding to various periods such as an equalizing pulse period (3H), a vertical synchronizing period (3H), an equalizing pulse period (3H), a horizontal synchronizing pulse period, an equalizing pulse period (3H), and a vertical synchronizing pulse period . . . . This horizontal synchronizing signal HSYNC is inputted into the inverter 509 and flip-flop 505. In the inverter 509, the horizontal synchronizing signal HSYNC is inverted and outputted as an inverted signal IH to the flip-flops 504, 506, and to the clock counter 510.

On the other hand, the "H" period of the vertical synchronizing signal VSYNC is sampled (counted) in the clock counter 501, and an output Q3 is outputted from the clock counter to the NOR circuit 511. This output Q3 is maintained, as shown in FIG. 4, up to a period of a horizontal synchronizing pulse after the vertical synchronizing signal VSYNC is switched to the "L" level.

Inputted into the flip-flop 504 is the inverted signal IH as a clock CK, and an output Q as well as an output Q# are outputted at a timing of the clock CK until a clear signal CLR is inputted from the NOR circuit 511. This output Q# is outputted to the clock counter 502 and functions as a reset signal R therein.

After the output Q3 from the clock counter 501 is switched to the "L" level and the horizontal synchronizing signal HSYNC is first changed to the "L" level, a continued period of the "H" level for the horizontal synchronizing signal HSYNC is sampled (counted) by the clock counter 502. When the period continues for 44.1 µs, the sampling by the clock counter 502 is completed, and an output Q1 is outputted by one pulse. In response to the output, an output Q from the flip-flop 505 is changed to the "H" level, and this level is maintained. It should be noted that an output Q9 from the clock counter 502 is inputted as a clock CK into the flip-flop 506 provided in the latter stage.

At this point of time, the output Q from the flip-flop 506 is at the "L" level, and for this reason an output QN from the NOR circuit 512 is switched to the "H" level. This output QN is maintained until the horizontal synchronizing pulse period is over. Namely, an output from the inverter 510 through the clock counter 503, namely an inverted signal IQX is changed to the "H" level by one pulse at a switching timing of the equalizing pulse period to the first "H" level after the horizontal synchronizing pulse period is over. Herein, the clock counter 503 counts the vertical synchronizing signal VSYNC up to the end thereof according to the inverted signal IH as well as to the output Q# from the flip-flop 506 and operates to clear the flip-flop 505. Then, this clock counter 503 synchronizes again to the next vertical synchronizing signal VSYNC.

The clear signal CLR is inputted into the flip-flop 505 in response to the above operation, and the output Q is reset. For this reason, output QN from the NOR circuit 512 terminates the "H" period. Even if the output QN is switched to the "L" level as described above, the flip-flop 508 continuously outputs a power-ON signal POWON to the reference power supply unit 55 until disturbance occurs in the horizontal synchronizing signal HSYNC.

Inputted into the clock counter 502 in this step is a clock CLK2 from the clock generator 52. This clock CLK2 functions as a clock to find a vertical synchronizing signal VSYNC within the horizontal synchronizing signal HSYNC.

A vertical synchronizing signal AVSYNC outputted from the NAND circuit 512 is a signal having no noise therein and is inputted into the NOR circuit 513. Determination is made in this NOR circuit 513 as to whether the vide signal is a null signal or not according to the vertical synchronizing signal AVSYNC as well as to the complex signal CSYNC. A result of the determination is outputted to the NOR circuit 514 provided in the latter stage. Determination is made in the NOR circuit 514 as to whether a normal video signal is inputted or not according to a result of the determination in the NOR circuit 513 as well as to the output Q# from the flip-flop 507 outputted at a timing of input of a noise clear clock NCLRC. The output from this NOR circuit 514 is supplied to the flip-flop 508.

As a result, a signal at the "L" level is outputted to the flip-flop 508, and the flip-flop 508 stops output of a power-ON signal POWON.

The noise clear clock NCLRC from the clock generator 52 is a clock for detecting any noise in the horizontal synchronizing period of the horizontal synchronizing signal HSYNC. Namely, with this noise clear clock NCLRC, erroneous determination that any noise is regarded as a vertical synchronizing period can be prevented.

As described above, with the embodiment, in the video signal processing circuit 3, power supply from the power supply unit 6 for the A/D converter 4 is executed only when the "H" period of a horizontal synchronizing signal separated from an input analog video signal continues for more than a prespecified period of time, so that unnecessary A/D conversion is eliminated to any video signal in which the "H" period of a horizontal synchronizing signal does not reach the prespecified period of time. With this feature, it is possible to prevent wasteful power consumption not only in the video signal processing circuit 3 but also in the system as a whole.

Also, in the video signal processing circuit 3, power supply is stopped from the power supply unit 6 when disturbance is confirmed in a horizontal synchronizing signal separated from an input analog video signal, so that power supply from the power supply unit can be controlled in real time according to change in a horizontal synchronizing signal after normal power supply is started. With this feature, it is possible to realize reduction of power consumption in real time not only in the video signal processing circuit 3 but also in the system as a whole.

The NTSC system has been explained as an example in the embodiment described above, but the present invention is not limited to the above system but is applicable to other systems such as the PAL system and the SECAM system.

Although the invention has been described with respect to the specific embodiment for a clear and complete disclosure, the appended claims are not to be thus limited but are to be construed as embodying all modifications and alternative constructions that may occur to one skilled in the art which fairly fall within the basic teaching herein set forth.

With the present invention, power supply for A/D conversion is controlled according to a synchronizing signal to an input analog video signal, so that unnecessary A/D conversion is eliminated according to a video signal, and with this feature, there is provided the effect that it is possible to obtain a video signal processing circuit which can prevent wasteful power consumption in the circuit as a whole.

With the present invention, power supply for A/D conversion is executed only when a synchronizing signal separated from an input analog video signal satisfies prespecified conditions, so that unnecessary A/D conversion is eliminated to any video signal which does not satisfy the prespecified conditions, and with this feature, there is provided the effect that it is possible to obtain a video signal processing circuit which can prevent wasteful power consumption in the circuit as a whole.

With the present invention, power supply for A/D conversion is executed only when a "H" period of a horizontal synchronizing signal separated from an input analog video signal continues for more than a prespecified period of time, so that unnecessary A/D conversion is eliminated to any video signal in which the "H" period of a horizontal synchronizing signal does not reach the prespecified period of time, and with this feature, there is provided the effect that it is possible to obtain a video signal processing circuit which can prevent wasteful power consumption in the circuit as a whole.

With the present invention, power supply is stopped when disturbance is confirmed in a horizontal synchronizing signal separated from an input analog video signal, so that power supply can be controlled in real time according to change in a horizontal synchronizing signal after normal power supply is started, and with this feature, there is provided the effect that it is possible to obtain a video signal processing circuit which can realize reduction of power consumption in real time in the circuit as a whole.

With the present invention, in a video signal processing circuit, power supply from a power supply unit for A/D conversion is controlled according to a synchronizing signal to an input analog video signal, so that unnecessary A/D conversion is eliminated according to a video signal, and with this feature, there is provided the effect that it is possible to obtain a computer system which can prevent wasteful power consumption in the system as a whole.

With the present invention, in a video signal processing circuit, power supply from a power supply unit for A/D conversion is executed only when a synchronizing signal separated from an input analog video signal satisfies prespecified conditions, so that unnecessary A/D conversion is eliminated to any video signal which does not satisfy the prespecified conditions, and with this feature, there is provided the effect that it is possible to obtain a computer system which can prevent wasteful power consumption in the system as a whole.

With the present invention, in a video signal processing circuit, power supply from a power supply unit for A/D conversion is executed only when a "H" period of a horizontal synchronizing signal separated from an input analog video signal continues for more than a prespecified period of time, so that unnecessary A/D conversion is eliminated to any video signal in which the "H" period of a horizontal synchronizing signal does not reach the prespecified period of time, and with this feature, there is provided the effect that it is possible to obtain a computer system which can prevent wasteful power consumption in the system as a whole.

With the present invention, in a video signal processing circuit, power supply is stopped when disturbance is confirmed in a horizontal synchronizing signal separated from an input analog video signal, so that power supply from a power supply unit can be controlled in real time according to change in a horizontal synchronizing signal after normal power supply is started, and with this feature, there is provided the effect that it is possible to obtain a computer system which can realize reduction of power consumption in real time in the system as a whole.

This application is based on Japanese patent application No. HEI 9-284041 filed in the Japanese Patent Office on Oct. 16, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A video signal processing circuit comprising:

an A/D converter converting an input analog video signal to a digital video signal in response to a power supply;

a synchronism separating unit separating a synchronizing signal from said input analog video signal;

a monitoring unit monitoring a disturbance of the synchronizing signal and time for which the disturbance continues; and a power supply unit supplying power to said A/D converter, wherein said power supply unit stops the power supply to said A/D converter when the time for which the disturbance continues exceeds 45 micro seconds.

2. A video signal processing circuit comprising:

an A/D converter converting an input analog video signal to a digital video signal in response to power supply;

a synchronism separating unit separating a horizontal synchronizing signal from said input analog video signal;

a monitoring unit monitoring whether the "H" (high) period of the horizontal synchronizing signal separated by said synchronism separating unit continues for more than a pre-specified period of time or not; and a power supply unit supplying power to said A/D converter only when it is confirmed by said monitoring unit that the "H" period continues for more than said pre-specified period of time.

3. The video signal processing circuit according to claim 2, wherein said monitoring unit monitors disturbance of the horizontal synchronizing signal and time for which the disturbance continues and said power supply unit stops the power supply to said A/D converter when the time for which the disturbance continues exceeds 45 micro seconds.

4. A computer system connected to an external device and executing image processing according to an analog video signal inputted from the external device comprising:

a video signal processing circuit generating a digital video signal according to an analog video signal inputted from the external device;

an image processing circuit executing image processing according to a digital video signal generated by said video signal processing circuit; and a power supply unit supplying power within the computer system, wherein said video signal processing circuit comprises:

an A/D converter converting an input analog video signal to a digital video signal in response to a power supply, a synchronism separating unit separating a synchronizing signal from said input analog video signal, a monitoring unit monitoring a disturbance of the synchronizing signal and time for which the disturbance continues, and a power supply unit supplying the power to said A/D converter, wherein said power supply unit stops the power supply to said A/D converter when the time for which the disturbance continues exceeds 45 micro seconds.

5. A computer system connected to an external device and executing video processing according to an analog signal inputted from the external device comprising:

a video signal processing circuit generating a digital video signal according to an analog video signal inputted from said external device;

an image processing circuit executing image processing according to a digital video signal generated by said video signal processing circuit; and a power supply unit supplying power within the computer system, wherein said video signal processing circuit comprises:

an A/D converter converting an input analog video signal to a digital video signal in response to power supply, a synchronism separating unit separating a horizontal synchronizing signal from said input analog video signal, a monitoring unit monitoring whether the "H" (high) period of the horizontal synchronizing signal separated by said synchronism separating unit continues for more than a pre-specified period of time, and a power supply unit supplying the power from said power supply unit to said A/D converter only when it is confirmed by said monitoring unit that the "H" period continues for more than said pre-specified period of time.

6. The computer system according to claim 5, wherein said monitoring unit monitors disturbance of the horizontal synchronizing signal and time for which the disturbance continues and said power supply unit stops the power supply to said A/D converter when the time for which the disturbance continues exceeds 45 micro seconds.

* * * * *